May 2, 1961 R. DONOVICK ET AL 2,982,689
THIOSTREPTON, ITS SALTS, AND PRODUCTION
Filed March 1, 1955
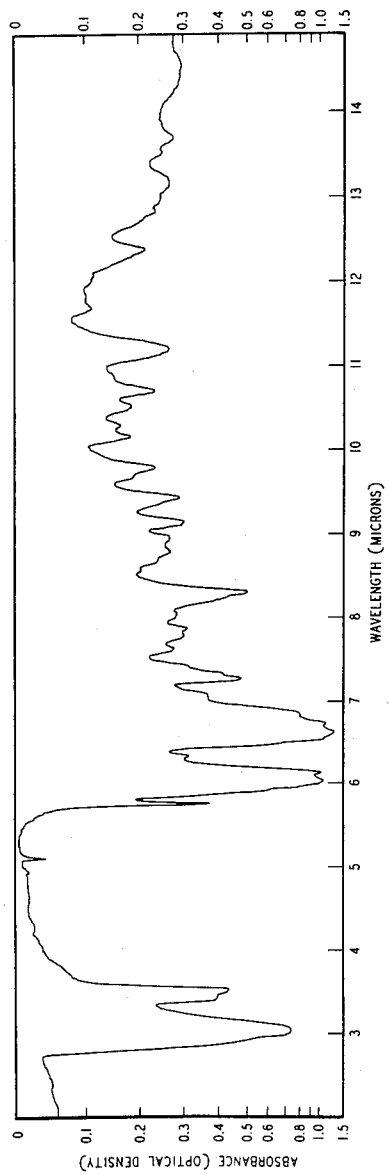
Inventors
RICHARD DONOVICK
JOSEPH F. PAGANO
JOHN VANDEPUTTE
By Robert Alpher
Attorney

2,982,689
THIOSTREPTON, ITS SALTS, AND PRODUCTION

Richard Donovick, Westfield, Joseph F. Pagano, Bound Brook, and John Vandeputte, Milltown, N.J., assignors to Olin Mathieson Chemical Corporation, New York, N.Y., a corporation of Virginia Filed Mar. 1, 1955, Ser. No. 491,392

7 Claims. (Cl. 167—65)

This invention relates to new and useful antibiotics and to methods for their production. More particularly, it relates to new antibiotics in various forms, and to processes for producing them by fermentation, as well as concentrating, purifying and isolating them, and producing their salts. In its free form, the new antibiotic is called thiostrepton.

The antibiotic of this invention is formed by the cultivation, under controlled conditions, of a hitherto undescribed species of Streptomyces.

THE MICROORGANISM

The microorganism useful for the preparation of thiostrepton is a strain of Streptomyces isolated from a sample of desert soil obtained in New Mexico, United States of America. A culture of the living organism has been deposited and made a part of the stock culture collection of the Rutgers Institute of Microbiology (New Brunswick, New Jersy), from which it is available, and where it has been assigned the number 3705 in the Waksman collection. It is hereinafter designated as *Streptomyces azureus*.

It is to be understood that the invention is not limited to the use of the particular organism described herein, but includes inter alia, mutants produced from the described organism by mutating agents, such as X-rays, ultraviolet radiation, actinophages, and nitrogen mustards.

For isolating and characterizing the microorganism, a portion of the soil sample is shaken in sterile distilled water and plated on screen agar medium. This medium contains:

| | | |
|---|---|---|
| Sucrose | gms | 10.0 |
| Citric acid | gms | 1.2 |
| $(NH_4)_2HPO_4$ | gm | 0.4 |
| KCl | gm | 0.08 |
| $MgCl_2 \cdot 6H_2O$ | gm | 04.18 |
| $MnCl_2 \cdot 4H_2O$ | gm | 0.036 |
| $FeCl_3 \cdot 6H_2O$ | gm | 0.023 |
| $ZnCl_2$ | gm | 0.021 |
| $CoCl_2 \cdot 6H_2O$ | gm | 0.004 |
| Agar | gm | 15.0 |
| Distilled water | ml | 1000 |

The cultures are then tested by streak plate procedure on yeast beef agar for antibiotic activity against both bacteria and fungi. The culture does not inhibit any of the test fungi but does inhibit the test bacteria *Micrococcus pyogenes* var. *aureus. Aerobacillus polymyxa, Streptococcus faecalis, Bacillus subtilis, Lactobacillus acidophilus, Clostridium septicum, Diplococcus pneumoniae, Corynebacterium diphtheriae,* and *Mycobacterium tuberculosis*.

The following is a description of colonies of the organism incubated for 10 days at 24° C. on various media [color description from Ridgeway's "Color Standards and Color Nomenclature," Washington, D.C., 1912]:

*Czepek-Dox agar.*—$NaNO_3$, 3 gm.; $KH_2PO_4$, 1 gm.; KCl, 0.5 gm.; $MgSO_4 \cdot 7H_2O$, 0.5 gm.; $FeSO_4 \cdot 7H_2O$, 0.01 gm.; glucose, 40 gm.; agar, 15 gm.; distilled water to 1000 ml. Growth is good, colonies have entire edges. Sporulation is white with smoke-gray areas and light Medici blue spots. Reverse growth is pale olive buff with dark glaucous grey spots. No exopigment produced.

*Sabouraud agar slant.*—Glucose, 40 gm.; neopeptone (partially hydrolyzed peptone), 10 gm.; agar, 15 gm.; distilled water to 1000 ml. Growth is good, colonies have curled edges, spores are white, reverse growth is ochraceous tawny to Mars brown. A brown exopigment is produced.

*Soy bean infusion agar.*—A 2% soybean meal suspension is boiled for 30 minutes and filtered hot. The pH is then adjusted to 7 with sodium hydroxide and 0.2% glucose, 0.5% NaCl, and 2% agar is added. Growth is good, colonies have entire edges, spores are white to pale Payne's grey, reverse growth is pale olive buff. No exopigment is produced.

*Henrici's agar.*—Caseinate or NZ-case (hydrolyzed casein), 5 gm.; glycerol, 5 ml.; $K_2HPO_4$, 2 gm.; $MgSo_4 \cdot 7H_2O$, trace; agar, 15 gm.; distilled water to 1000 ml., pH 7.0. Growth is good, colonies have entire edges, spores are white with dark dull grey sections, reverse growth is blackish brown. No exopigment is produced.

*Yeast beef agar.*—Beef extract, 1.5 gm.; yeast extract, 3 gm.; peptone, 6 gm.; dextrose, 1 gm.; agar, 15 gm.; distilled water to 1000 ml. Growth is slight, colonies have entire edges, spores are white, reverse growth is avellaneous. No exopigment produced.

The culture liquifies gelatin and produces an acid curd in milk, but does not produce indole or reduce nitrate to nitrate.

The organism is capable of utilizing the following carbon sources in basal medium containing $(NH_4)_2SO_4$ as a source of nitrogen: arabinose, rhamnose, xylose, glucose, galactose, fructose, mannose, lactose, maltose, sucrose, dextrin, inulin, raffinose, starch, glycerol, inositol and mannitol. Growth is supported poorly by salicin, sorbitol, sodium citrate and sodium acetate. Growth is not supported by dulcitol, ammonium formate, ammonium oxalate, and ammonium tartrate. In a basal medium containing starch as a source of carbon the following nitrogen sources will support growth: ammonium sulfate, sodium nitrate, sodium nitrite and asparagine. Growth is supported poorly by 1-tyrosine and d,1-tryptophane. Growth is not supported by acetamide.

THE ANTIBIOTIC

*Streptomyces azureus* has been found to produce a mixture of antibiotics. When grown in a suitable medium, at least three different antibiotics are produced. When the mycelium is separated from the broth by filtration, one of the antibiotics is present primarily in the mycelium mat whereas the other two antibiotics are present principally in the filtrate. The antibiotic with which this invention is primarily concerned is the one that is extracted from the mycelium mat, which has been assigned the name thiostrepton.

In order to form thiostrepton, *Streptomyces azureus* is grown at a suitable temperature of from 20° C. to 35° C., preferably about 25° C. to 27° C., under submerged aerobic conditions in an aqueous nutrient medium containing an assimilable, fermentable carbon and energy source and an assimilable nitrogen source. Suitable sources of carbon, as indicated above, include carbohydrates such as: starch, dextrin, and sugars such as maltose, lactose, and glucose; glycerol; lipids; fats; etc. Suitable nitrogen sources include organic nitrogen source, such as asparagine and soybean meal, as well as inorganic sources of nitrogen, such as ammonium sulfate or sodium nitrate. The fermentation is carried out for about 72 to 168 hours at a pH in the range of about 6 to 8. At the end of this period of time, a substantial amount of thiostrepton has been formed (as shown by bioassays), as more fully disclosed in the examples.

After growth has been completed, thiostrepton is isolated from the whole broth by separating the mycelium cake from the broth by filtering or centrifuging. Thiostrepton is then extracted from the mycelium cake by means of a suitable organic solvent, such as chloroform, dioxane, an N,N-di(lower alkyl) lower alkanoic acid amide (e.g. N,N-dimethylformamide or N,N-dimethylacetamide) or benzyl alcohol.

Thiostrepton is a weak base which forms salts with acids, particularly mineral acids (e.g. hydrochloric acid or sulfuric acid) when reacted therewith in an organic solvent such as an alcohol (e.g. ethanol). The antibiotic also forms complexes with alkaline earth metal salts (e.g. calcium chloride or magnesium chloride) when reacted therewith in an organic solvent such as an alcohol (e.g. methanol). Both the acid-addition salts and alkaline earth metal complexes are hydrolyzed when contacted with water.

The following examples illustrate suitable methods for preparing, purifying and forming derivatives of the antibiotics of this invention.

*Example 1.—Shake flask fermentation of Streptomyces azureus*

Germination stage.—A loopful of a culture of *Streptomyces azureus* is transferred to a 500 ml. flask containing the following medium:

| | |
|---|---|
| Soybean meal _____g__ | 15 |
| Dextrose _____g__ | 30 |
| CaCO₃ _____g__ | 2.5 |
| NaCl _____g__ | 1.0 |
| Tap water _____ml__ | 1000 |

The flask is incubated for two days at 25° C. on a reciprocating shaker (140 strokes per minute, 1¾ inch throw).

Fermentation stage.—A 10 ml. inoculum prepared in the germination stage is transferred from the germination flask to each of five 1 liter flasks containing a medium consisting of:

| | |
|---|---|
| Soybean meal _____g__ | 30 |
| Dextrose _____g__ | 20 |
| CoCl₂·6H₂O _____g__ | 0.005 |
| CaCO₃ _____g__ | 1.0 |
| Tap water _____ml__ | 1000 |

The flasks are incubated for seven days at 25° C. on a reciprocating shaker. At the end of seven days, centrifuged neutral broth samples are tested for activity against *Micrococcus pyogenes* var. *aureus* and *Mycobacterium tuberculosis* BCG with the following results:

POTENCY IN DILUTION UNITS

| M. pyogenes var. aureus | M. tuberculosis BCG |
|---|---|
| 250–385 | 100 |

*Example 2.—Tank fermentation of Streptomyces azureus*

I. *Inoculum source.*—Stock cultures of *Streptomyces azureus* are transferred weekly to fresh slants of Gould agar (20 g. agar, 10 g. glucose, 2.5 g. yeast extract, 1.0 g. K₂HPO₄ and 1000 ml. distilled water). Inoculated slants are used after 3 to 5 days of incubation at 25° C.

II. *Inoculum preparation.*—Into a 500 ml. flask containing 100 ml. of the following aqueous medium:

| | |
|---|---|
| Soybean meal _____g__ | 15 |
| Dextrose _____g__ | 20 |
| CaCO₃ _____g__ | 5 |
| NaCl _____g__ | 1 |
| Tap water _____ml__ | 1000 | which has been sterilized for 30 minutes at 121° C. after adjustment of pH to 7.0 to 7.2 with sodium hydroxide, is placed a loopful of the growth from the "inoculum source." The culture is incubated for 72 hours at 25° C., at the end of which time 10 ml. of the culture is transferred to a second 100 ml. portion of medium in a second flask. This second culture is incubated for 48 hours at 25° C., at the end of which time the contents of the second flask are transferred to a 1000 ml. portion of the medium in a 4-liter flask. This third culture is incubated for 48 hours at 25° C., and then transferred to a 10-gallon germinator containing 25 liters of a medium which has been previously sterilized for 15 minutes at 121° C. and consists of:

| | |
|---|---|
| Soybean meal _____g__ | 750 |
| Glucose _____g__ | 1000 |
| CaCO₃ _____g__ | 25 |
| Tap water _____liters__ | 25 |

(pH adjusted to 7.0 with NaOH before and after sterilization.)

The germinator is aerated and agitated for 30 to 36 hours at 25° C. under a gauge pressure of 10 p.s.i. A defoamer is also added to the medium to prevent excessive foaming.

III. *Fermentation.*—Into a 100-gallon fermentor containing 50 gallons of a medium, which has been previously sterilized for 15 minutes at 121° C., consisting of:

3.0% soybean meal
3.0% glucose
0.5% CaCO₃
0.2% Na₂SO₄
0.25% Foamrex S (Socony Vacuum Oil Company Inc. brand of a stable wax emulsion), or other defoamer
Adjust pH to 7.0 with NaOH before sterilization is added the contents of the germinator. The fermentor is aerated and agitated for 56 to 108 hours at 25° C. under a gauge pressure of 10 p.s.i.

At the end of 50 to 80 hours, the potency reaches a maximum of 10,000 to 16,000 dilution units/ml. (against *Micrococcus pyogenes* var. *aureus*) and remains substantially constant thereafter. The pH of the fermentation broth remains substantially constant, in the range of 7.0 to 7.4, during the fermentation period.

Thiostrepton may then be separated from the whole broth by the procedures illustrated in the following examples.

*Example 3.—Extraction of thiostrepton from mycelium*

The neutral whole broth is filtered and the cake dried as much as possible in a press. The wet filter cake is then placed in a volume of chloroform just large enough to yield a good slurry (12–15 gallons per 100 lbs. of wet cake) and agitated vigorously for one-half hour. The mixture is filtered, the chloroform separated from the water present and the chloroform retained. The cake is then extracted with a second volume of chloroform (8–10 gallons per 100 lbs. of wet cake), filtered, the chloroform separated and combined with the first extract. The combined chloroform extracts are then distilled under vacuum (25° C. maximum pot temperature) to ¹⁄₅₀ the original volume. To this concentrate is added 10 volumes of hexane. After standing for 1 hour, the precipitate is filtered off, washed with acetone and dried.

The precipitate (A) contains 70–90% pure thiostrepton, and can be further purified and crystallized by dissolving it in dioxane (1 g./10 ml.), adding carbon (2% w./v.), warming the mixture with stirring to 50° C., then filtering and adding 5 volumes of water slowly to the filtrate. The crystalline precipitate so obtained is fairly pure but is still somewhat colored. It can be further purified and a whiter product obtained by redissolving it in dioxane (1 g./15 ml.), filtering and adding to the filtrate slowly 5 volumes of a 50% aqueous methanol solution. The mixture is allowed to stand overnight at room temperature and then the crystalline precipitate of thiostrepton is separated, washed with acetone and dried. The product is a white or very light yellow, uniformly crystalline material which assays 100,000–110,000 du./mg. (*Micrococcus pyogenes* var. *aureus*). The yields in each of the crystallization and recrystallization steps are between about 75 and 80%.

Two additional active materials are also present in small quantities in the whole broth. One of these materials may be obtained from the first crude precipitate (A) by slurrying it in acetone. This particular material is soluble in acetone and can be isolated therefrom by precipitation with water or evaporation of the acetone solvent to dryness. The bioassay of this partially purified material is of the order of 6,000–8,000 du./mg. (*Micrococcus pyogenes* var. *aureus*).

Another material present can be recovered by crystallization of the mother liquors of the second precipitation of thiostrepton. It has greater solubility than thiostrepton and is only recovered from the recrystallization organic mother liquors after addition of much water. The in vitro bio-potency of the crude material is of the order of 15,000–20,000 du./mg. (*Micrococcus pyogenes* var. *aureus*).

*Example 4.—Preparation of the hydrochloride salt of thiostrepton*

The hydrochloride of thiostrepton is formed by slurrying the crystalline or crude thiostrepton in an alcohol such as methanol, and then adding an equivalent of hydrochloric acid as a concentrated aqueous solution. The thiostrepton dissolves, indicating formation of a salt. The hydrochloride can be precipitated from this solution by adding ether or ethyl acetate. The hydrochloride is unstable as the solid or in the original methanol solution, the activity falling off rapidly. If water is added to the solid or to the alcohol solution, the salt is immediately hydrolyzed and the free base obtained.

Other acid-addition salts, such as the sulfate, can be prepared in the same way as the hydrochloride, and have the same general properties.

*Example 5.—Preparation of the calcium chloride complex of thiostrepton*

The calcium chloride complex is formed by slurrying thiostrepton base in a 0.5% methanolic calcium chloride solution at a concentration of 4–5 mg. per ml. The base slowly dissolves, indicating complex formation since in the absence of calcium chloride it will not dissolve. When solution is complete, the complex is precipitated by addition of ether or ethyl acetate. Addition of water to the solid or to the original methanol solution will cause the complex to immediately hydrolyze, yielding the free base.

CHEMICAL AND PHYSICAL PROPERTIES OF THIOSTREPTON

Crystalline thiostrepton has the following physical and chemical characteristics:

*Melting point.*—Darkens at about 325° C. and melts with decomposition at about 246–256° C.

Elementary analysis (approximate):
C=51.75%
H=5.30%
S=9.22%
N=15.84%
O=17.89% (by difference)
No other elements present.
No methoxy groups. Does not form esters with succinic or phthalic anhydrides.
Equivalent weight=380

*Solubility.*—Good solubility in dioxane, chloroform, N,N-dimethylformamide, N,N-dimethylacetamide and benzyl alcohol. Soluble to the extent of 100–200 mcg./ml. in alkanols, such as methanol, ethanol, isopropanol, and butanol, and in trichloroethylene and propylene glycol. Almost insoluble in water (10–20 mcg./ml.). Insoluble in ether, acetone, benzene, hexane, ethyl acetate, amyl acetate, dibutyl ether, glycol, diethylene glycol, glycerol, corn oil, sesame oil, and ethyl oleate.

*Stability.*—Stable for up to one week in 50% dioxane–50% water solution at pH 7 at 30° C. Quite unstable in the same solvent system at pH's 2 and 11. Stable in dimethylacetamide for at least two months at below room temperature (only slight loss of activity after two months at room temperature).

*Ultraviolet spectrum.* — The ultraviolet absorption shoulders of crystalline thiostrepton in methanol are located at the following wave lengths:

$\lambda(m\mu)$
240
280
305

*Infra red spectrum (see figure of the drawing).*—The infrared absorption peaks and shoulders (sh) are located at the following frequencies and wave lengths:

| $\gamma$ (cm.$^{-1}$) | $\lambda(\mu)$ | $\gamma$ (cm.$^{-1}$) | $\lambda(\mu)$ |
|---|---|---|---|
| 3,289 | 3.04 | 1,116 | 8.96 |
| 1,733 | 5.77 | 1,094 | 9.14 |
| 1,658 | 6.03 | 1,060 | 9.43 |
| 1,631 | 6.13 | 1,033 | 9.68 (sh) |
| 1,580 | 6.33 | 1,020 | 9.80 |
| 1,534 | 6.52 (sh) | 984 | 10.16 |
| 1,511 | 6.62 | 971 | 10.30 |
| 1,486 | 6.73 | 951 | 10.52 |
| 1,420 | 7.04 (sh) | 935 | 10.70 |
| 1,376 | 7.27 | 921 | 10.86 (sh) |
| 1,366 | 7.32 (sh) | 893 | 11.20 |
| 1,348 | 7.42 (sh) | 856 | 11.68 |
| 1,309 | 7.64 | 808 | 12.38 |
| 1,282 | 7.80 | 780 | 12.82 |
| 1,269 | 7.88 | 769 | 13.00 (sh) |
| 1,244 | 8.04 (sh) | 760 | 13.15 |
| 1,203 | 8.31 | 740 | 13.52 |
| 1,166 | 8.58 (sh) | 730 | 13.70 |
| 1,152 | 8.68 (sh) | | |
| 1,138 | 8.79 | | |

BIOLOGICAL PROPERTIES OF THIOSTREPTON

Thiostrepton possesses a wide antibacterial spectrum against many bacteria (and viruses), as indicated by the partial listing following:

| Microorganism | Minimal Inhibiting Concentration in $\gamma$/ml. |
|---|---|
| *Micrococcus pyogenes* var. *aureus*: | |
| 209P | 0.01–0.02 |
| Cahill | 0.03 |
| No. 5 | 1.25 |
| No. 376 | 1.67 |
| *Streptococcus pyogenes* C203 | 0.003 |
| *Bacillus subtilis* | 0.03 |
| *Streptococcus faecalis* | 0.06 |
| *Lactobacillus acidophilus* | 0.06 |
| *Clostridium septicum* | 0.15 |
| *Diplococcus pneumonia* type 3 | 0.3 |
| *Corynebacterium diphtheriae* | 0.4 |
| *Mycobacterium tuberculosis* var. *bovis* (BCG) | 3.0 |
| *Aerobacter aerogenes* | 50 |
| *Escherichia coli* | 50 |
| *Pseudomonas aeruginosa* | 50 |
| *Salmonella schottmulleri* | 50 |
| *Shigella sonnei* | 50 |
| *Klebsiella pneumoniae* | 50 |
| *Proteus vulgaris* | 50 |
| *Salmonella typhosa* | 30 |
| *Shigella dysenteriae* | 30 |

Further tests have been conducted in eggs, mice, rats, rabbits, and cats to determine the toxicity and effectiveness of thiostrepton.

To determine the in vivo activity of thiostrepton against meningopneumonitis virus in eggs, seven-day old embryonated eggs were infected with 100 LB$_{50}$'s of a standardized meningopneumonitis virus inoculum via the yolk sac. The eggs were then treated one day after infection via the yolk sac with thiostrepton dissolved in dimethylacetamide (1:10 ratio of antibiotic to dimethylacetamide) at the levels indicated in Table 1.

cated in Table 3. For comparison, tests were also run using the potassium salt of penicillin G instead of the antibiotic of this invention.

TABLE 3

| Antibiotic | Mode of Administration | Activity vs. *M. pyogenes* var. *aureus* | | | |
|---|---|---|---|---|---|
| | | Penicillin-sensitive Strain No. 5 | | Penicillin-resistant Strain No. 376 [2] | |
| | | DST [1] | S/T | DST [1] | S/T |
| Saline control | Average survival time=20 hours; Survived/Total (S/T)=0/10 | | | | |
| Thiostrepton | 100 mcg. antibiotic+1,000 mcg. N,N-dimethylacetamide (DMA) in 0.5 ml. physiological saline solution. | 222 | 10/10 | 220 | 10/10 |
| | 50 mcg. antibiotic+500 mcg. DMA in 0.25 ml. physiological saline solution. | 200 | 9/10 | 109 | 5/10 |
| | 25 mcg. antibiotic+250 mcg. DMA in 0.125 ml. physiological saline solution. | 89 | 4/10 | 42 | 2/10 |
| | 100 mcg. antibiotic+1,000 mcg. dioxane in 0.5 ml. physiological saline solution. | 190 | 8/10 | 163 | 7/10 |
| | 50 mcg. antibiotic+500 mcg. dioxane in 0.25 ml. physiological saline solution. | 44 | 2/10 | 0 | 0/9 |
| | 25 mcg. antibiotic+250 mcg. dioxane in 0.125 ml. physiological saline solution. | 32 | 1/10 | 0 | 0/10 |
| Penicillin G potassium | 60 mcg. antibiotic in 0.5 ml. physiological saline solution. | 155 | 7/10 | 0 | 0/10 |
| | 30 mcg. antibiotic in 0.25 ml. physiological saline solution. | 123 | 5/10 | 0 | 0/9 |
| | 15 mcg. antibiotic in 0.125 ml. physiological saline solution. | 133 | 6/10 | 0 | 0/10 |

[1] DST=Difference in survival time over controls (in hours).
[2] Resistant to 100 units of penicillin in vitro.

TABLE 1

| Level tested (mg./egg) | Average Survival Time (hours) | Difference in Survival Time (hours) [1] | Survivors/Total (after 10 days) | PD$_{50}$ [2] (mg./egg) |
|---|---|---|---|---|
| Control (dimethylacetamide) | 158 | | 0/18 | |
| 1.0 | 219 | +61 | 8/16 | 0.72 |
| 0.5 | 213 | +55 | 7/17 | |
| 0.25 | 189 | +31 | 1/17 | |

[1] Live embryos on the tenth day post infection were assigned survival times of 240 hours for the purpose of calculation.
[2] Reeds and Muench's method.

To determine the in vivo activity of thiostrepton against *Streptococcus pyogenes* C203 in mice, the mice were infected with a standardized inoculum of *Streptococcus pyogenes* C203 by intraperitoneal injection. The mice were then treated by subcutaneous injection with thiostrepton dissolved in pure N,N-dimethylacetamide and diluted with water to the final concentration indicated in Table 2.

TABLE 2

| Level Tested (mcg./mouse in 0.5 ml. of solution) | Percentage Survival (percent) |
|---|---|
| Control (saline solution) | 0 |
| 40 | 100 |
| 20 | 100 |
| 10 | 20 |

Tests were also conducted to determine the activity of thiostrepton against *Micrococcus pyogenes* var. *aureus* No. 5 (penicillin-sensitive strain) and *Micrococcus pyogenes* var. *aureus* No. 376 (penicillin-resistant strain) in mice. For these determinations, mice weighing 18–20 grams were infected intraperitoneally with a standardized inoculum of the respective strains in 5% mucin. The infected mice were then treated by intravenous injection with a single dose of thiostrepton in the manner indi- The foregoing tests demonstrate the particular effectiveness of thiostrepton in vivo against micrococcic and streptococcic infections.

To determine the acute toxicity of thiostrepton in mice, a 10% solution of the antibiotic in N,N-dimethylacetamide was diluted 1 in 20 with distilled water and administered intravenously (0.1 ml./5 sec.) into the mice. The LD$_{50}$ was found to be about 41.7 mg./kg. and the estimated LD$_2$ was 23.1 mg./kg. It has also been determined that a single intravenous injection of 5 mg. of thiostrepton/kg. has no untoward effect on test animals such as cats, rats, and rabbits.

Thiostrepton is an effective anti-infective medicine having the same general antibiotic spectrum as penicillin and thus can be used against gram positive coccal infections.

The invention may be variously otherwise embodied within the scope of the appended claims.

We claim:

1. A process for producing a thiostrepton-containing antibiotic preparation which comprises cultivating a strain of *Streptomyces aureus* in an aqueous nutrient medium comprising an assimilable, fermentable carbon and energy source and an assimilable nitrogen source, under aerobic condtions until substantial activity is imparted to said medium and recovering the antibiotic from said medium.

2. A substance effective in inhibiting the growth of gram-positive bacteria, selected from the group consisting of thiostrepton and the salts thereof, said thiostrepton being a weakly basic substance having the following elementary analysis: C=51.75%, H=5.30%, S=9.22%, N=15.84%, O=17.89%; has an antibacterial spectrum including the following bacteria: *Micrococcus pyogenes* var. *aureus*, *Streptococcus pyogenes* C203, *Bacillus subtilis*, *Streptococcus faecalis*, *Lactobacillus acidophilus*, *Clostridium septicus*, *Dyplococcus pneumoniae* type 3, *Corynebacterium diphtheriae* and *Mycobacterium tuberculosis* var. *bovis* (BCG); possesses a crystalline structure in the pure state; is substantially soluble in dioxane, chloroform, N,N-dimethylformamide, N,N-dimethylacetamide and benzyl alcohol, and relatively insoluble in water and the lower alkanols; darkens at about 235° C. and melts at about 246–256° C. with decomposition; has an absorption spectrum measured in methanolic HCl with shoulders at the following wave lengths: 240, 280, and 305 millimicrons; and an infrared spectrum when suspended in hydrocarbon oil in solid form substantially as shown in the drawing.

3. Thiostrepton, as described in claim 2.
4. A salt of thiostrepton, as described in claim 2.
5. A hydrochloride of thiostrepton, as described in claim 2.
6. A sulfuric acid salt of thiostrepton, as described in claim 2.
7. A calcium chloride complex of thiostrepton, as described in claim 2.

References Cited in the file of this patent

UNITED STATES PATENTS 2,612,502   Leach _____ Sept. 30, 1952

OTHER REFERENCES

Waksman: Actinomycetes and Their Antibiotics, pub. 1953 by Williams and Wilkins Co. Baltimore, Md., pp. 168–184, 230.

Payne et al.: Antibiotics and Chemotherapy, May 1951, pp. 138–139.

Waksman: Actinomycetes and Their Antibiotics, pp. 68 and 69, pub. 1953 by Williams and Wilkins Co. Baltimore, Md.

Hesseltine et al.: Annals of the New York Academy of Sciences, pages 136–151, pub. October 29, 1954.

Pagano et al.: Abstracts of paper No. 75, 76 and 77 presented at the Antibiotics Symposium, No. 3, 1955, 3 pages.

UNITED STATES PATENT OFFICE
CERTIFICATE OF CORRECTION

Patent No. 2,982,689

May 2, 1961

Richard Donovick et al.

It is hereby certified that error appears in the above numbered patent requiring correction and that the said Letters Patent should read as corrected below.

Column 1, line 49, right-hand column of the table, for "04.18" read -- 0.418 --; column 3, line 21, for "snitable" read -- suitable --; column 8, line 49, for "aureus" in italics, read -- azureus --; in italics.

Signed and sealed this 3rd day of October 1961.

(SEAL)
Attest:

ERNEST W. SWIDER
Attesting Officer

DAVID L. LADD
Commissioner of Patents
USCOMM-DC